United States Patent
Jahn et al.

(10) Patent No.: US 11,199,420 B2
(45) Date of Patent: Dec. 14, 2021

(54) METHOD FOR DYNAMICALLY ADAPTING AN OPERATING DEVICE IN A MOTOR VEHICLE, AS WELL AS OPERATING DEVICE AND MOTOR VEHICLE

(71) Applicant: AUDI AG, Ingolstadt (DE)

(72) Inventors: Nicky Jahn, Ingolstadt (DE); Thomas Schien, Kelheim (DE)

(73) Assignee: AUDI AG, Ingolstadt (DE)

(*) Notice: Subject to any disclaimer, the term of this patent is extended or adjusted under 35 U.S.C. 154(b) by 394 days.

(21) Appl. No.: 16/385,164

(22) Filed: Apr. 16, 2019

(65) Prior Publication Data
US 2019/0331504 A1  Oct. 31, 2019

(30) Foreign Application Priority Data

Apr. 30, 2018 (DE) .......................... 102018206653.1

(51) Int. Cl.
*G01C 21/36* (2006.01)

(52) U.S. Cl.
CPC ...... *G01C 21/3617* (2013.01); *G01C 21/3611* (2013.01)

(58) Field of Classification Search
None
See application file for complete search history.

(56) References Cited

U.S. PATENT DOCUMENTS

| | | | | |
|---|---|---|---|---|
| 9,467,515 B1 * | 10/2016 | Penilla | ............ | G06F 3/04883 |
| 9,536,197 B1 * | 1/2017 | Penilla | ............ | G06F 3/147 |
| 10,503,355 B2 * | 12/2019 | Kim | ............ | G06F 3/04817 |
| 2015/0134244 A1 | 5/2015 | Hershey et al. | | |

FOREIGN PATENT DOCUMENTS

| | | | | |
|---|---|---|---|---|
| DE | 102006037156 A1 | 9/2007 | | |
| DE | 102006059057 A1 | 6/2008 | | |
| DE | 102014202234 A1 | 8/2015 | | |
| DE | 112014004372 T5 | 6/2016 | | |
| DE | 102015216484 A1 | 3/2017 | | |
| EP | 1080978 B1 * | 12/2006 | ............ | B60K 37/06 |
| EP | 1932711 A2 * | 6/2008 | ............ | G06F 3/0481 |
| EP | 1522009 B1 * | 12/2010 | ............ | B60K 35/00 |
| JP | 5955486 B2 | 6/2016 | | |

(Continued)

OTHER PUBLICATIONS

S. Matsuyama, T. Yamabe and R. Kiyohara, "On-vehicle Information Devices Based on User Context," 2015 IEEE 39th Annual Computer Software and Applications Conference, 2015, pp. 601-606, doi: 10.1109/COMPSAC.2015.56. (Year: 2015).*

(Continued)

*Primary Examiner* — Kelly D Williams
(74) *Attorney, Agent, or Firm* — Maier & Maier, PLLC

(57) ABSTRACT

A method for adapting an operating device in a motor vehicle. The operating device is provided for operating at least one vehicle function of the motor vehicle. In at least one driving situation, observation data which describe the current driving situation and usage data which describe which of the vehicle functions is currently activated via the operating device are in each case detected by the operating device, and an assignment rule is generated on the basis of the observation data and the usage data by a procedure of automatic learning.

15 Claims, 2 Drawing Sheets

(56) References Cited

FOREIGN PATENT DOCUMENTS

| | | |
|---|---|---|
| JP | 2016-196293 A | 11/2016 |
| JP | 2018-013446 A | 1/2018 |
| WO | WO-2016096700 A1 * 6/2016 ............. B60K 35/00 |

OTHER PUBLICATIONS

R. Jain, J. Bose and T. Arif, "Context based adaptation of application icons in mobile computing devices," 2013 Third World Congress on Information and Communication Technologies (WICT 2013), 2013, pp. 31-36, doi: 10.1109/WICT.2013.7113104. (Year: 2013).*

Korean Office Action dated May 5, 2020, in connection with corresponding KR Application No. 10-2019-0050569 (13 pgs., including machine-generated English translation).

German Search Report dated Jan. 16, 2019 in corresponding German Application No. 102018206653.1; 24 pages.

* cited by examiner

METHOD FOR DYNAMICALLY ADAPTING AN OPERATING DEVICE IN A MOTOR VEHICLE, AS WELL AS OPERATING DEVICE AND MOTOR VEHICLE

FIELD

The disclosure relates to a method of adapting an operating device in a motor vehicle. This operating device is adapted to a user's behavior. The disclosure also comprises an operating device which can be operated in accordance with the method, and a motor vehicle equipped with such an operating device.

BACKGROUND

An operating device can be implemented or provided in a motor vehicle, for example by means of an on-board computer. Such an operating device can, for example, provide a menu structure with several menu levels or general user interfaces on a touch screen. A menu structure is a hierarchical arrangement of menu levels, between which the user can alternate by pressing a respective graphic control element (e.g. a pictogram or lettering) in the currently displayed menu level. Other control elements may be provided to activate a motor vehicle function, such as the radio or telephone. The motor vehicle function is then operated via a user interface. There, control elements for setting the function parameters of the motor vehicle function can be provided. For example, one user interface for radio operation, one for navigation operation, and one for telephone operation may be provided.

Menu levels are usually static or can be manually adjusted by a user to allow the user to select which controls to display and which to delete at each menu level. But even if the user has adjusted this according to their requirements, the menu structure remains unchanged in this way for the entire period of the motor vehicle's use. Here, a user has different requirements in different driving situations in relation to the availability of control elements in the menu levels. For example, a driver can require other motor vehicle functions in the morning and activate them accordingly via the menu structure than in the evening.

The same also applies to the configuration or parameterization of the individual motor vehicle functions on a user interface. If, for example, a function parameter, such as a radio station, can be selected in the operating device, a user can set this manually once, but must then again take action themselves when the driving situation changes if the user wishes to change the setting for the function parameter for the changed driving situation, for example a different radio station.

DE 10 2006 059 057 A1 discloses, for example, that the function assignment of mechanical control elements on a steering wheel of a motor vehicle can be freely adjusted by a user. A dynamic adaptation of the function assignment without user intervention and depending on the driving situation is, however, not provided.

DE 10 2006 037 156 A1 discloses that the graphical design of the user interface of an operating device can be adaptively adjusted to the current operating situation. For example, buttons can be magnified when sensor information indicates that the user is approaching such a button with their finger. However, there is no learning effect in that the operating device would adapt to the user's habits over time and could therefore recognize which operating steps the user plans to perform in the morning or evening.

DE 10 2015 216 484 A1 discloses an operating device which, based on user usage data and situation data describing a current driving situation, forms a control data record which enables the operating device to offer the user an operating recommendation for a current driving situation, for example in the form of a so-called shortcut menu. In other words, the actual menu structure of the operating device remains unchanged while, at the same time, so-called shortcuts are displayed in a separate display field. The control data record used to form the shortcut menu may, for example, be formed on the basis of a machine learning method, in particular a neural network. However, the disadvantage of using a dynamic shortcut menu is that the actual menu structure of the operating device remains in unadapted state and its complexity therefore does not decrease even if the user behavior is known.

SUMMARY

The invention is based on the object of adapting an operating device in a motor vehicle to a user's behavior.

The object is solved by the subject matters of the independent patent claims. Advantageous embodiments of the invention result from the dependent patent claims, the following description as well as the figures.

The invention provides a method of adapting an operating device in a motor vehicle. The method assumes that the operating device is intended for operating at least one motor vehicle function of the motor vehicle, for example a radio and/or telephone and/or navigation system. The operating device is adaptable. Compared to a predetermined, unadapted state (for example, the so-called factory state), it is provided that a number of displayed control elements for respectively activating one of the motor vehicle functions is reduced in the operating device in adapted state. Such a control element can be provided for the direct activation of a motor vehicle function or indirectly, in that the control element in a menu structure leads down one menu level (submenu), in which the motor vehicle function can then be activated by an additional control element. More than one submenu can, of course, be provided. In addition to or as an alternative to reducing the displayed control elements, it may be provided that a presetting of at least one function parameter of at least one of the motor vehicle functions (for example, the function parameter setpoint temperature) is set deviating from a predetermined standard setting in a respective operator interface. By adapting the operating device, at least one motor vehicle parameter can therefore be set to a value deviating from the standard setting. In this case the default setting can provide that no value is set at all or a predetermined default value is set. The menu structure of the operating device can be adapted (reduction of the displayed control elements) and/or at least one motor vehicle parameter can be preset (on a user interface for a motor vehicle function).

In order to personalize or adapt this operating device to a user, the invention provides that in at least one driving situation, observation data describing the current driving situation and usage data are recorded by the operating device. The usage data describe which of the motor vehicle functions is currently activated and/or which respective setting is available for at least one function parameter. It is therefore known from the usage data which of the motor vehicle functions a user of the motor vehicle currently uses and how (i.e., with which function parameters). The observation data and the associated usage data are each recorded for one driving situation or for several driving situations.

This results in an overall description of the usage behavior according to the usage data for at least one driving situation described or observed in accordance with the observed data.

On the basis of the observation data and the usage data, an assignment rule is generated by means of a method of machine learning (for example using an artificial neural network and/or a Hidden Markov model) which assigns to the observation data a state of the operating device adapted in accordance with the usage data. The assignment rule therefore describes in which driving situation, i.e., with which observation data, which motor vehicle function is active or inactive in the motor vehicle and/or which respective setting is specified for at least one function parameter.

In the method, the state of the operating device is now adapted in at least one further driving situation by means of the assignment rule, depending on the observation data determined in the additional driving situation. In the at least one additional driving situation, observation data are also recorded. These observation data represent an input for the assignment rule. Depending on these observation data, the assignment rule then specifies or indicates which at least one motor vehicle function will be activated in the motor vehicle, for example with a predetermined minimum probability, and/or which at least one function parameter of at least one of the motor vehicle functions will be set to which value, for example with a predetermined minimum probability. The assignment rule predicts the user behavior that the user is likely to show in the respective driving situation. The operating device is then adapted accordingly, i.e., an adapted state of the operating device is generated in which a number of displayed control elements is reduced in the manner described and/or a presetting of at least one function parameter is provided or set. Here, of course, the selection of the remaining displayed control elements and/or the presetting of at least one function parameter are carried out in such a way that they correspond to the assignment rule, i.e., as they are likely to result from the observation data, i.e., for example with a predetermined minimum probability. If one were to use the observation data used in machine learning as input, the assignment rule would also reproduce the usage data used in machine learning.

The advantage of this invention is that the operating device guides the user to their operating goal faster for the current driving situation. The operating device is already adapted to the anticipated or predicted user behavior or that predicted by means of the assignment rule before the user displays user behavior in a current, additional driving situation. The adaptation is made by bringing about an adapted state of the operating device. This means that fewer control elements are displayed to the user and/or at least one function parameter is preset.

The invention also comprises embodiments which offer additional advantages.

One embodiment provides that, when the state of the operating device is adapted to the respective additional driving situation, at least one control element is deleted from the menu level by the assignment rule in at least one menu level of a menu structure of the operating device from the respective control elements of the menu level, as they are provided or displayed in the unadapted state. In each case, such a control element is deleted which is assigned to a motor vehicle function which will be deactivated with a predetermined minimum probability in the current additional driving situation (in accordance with the usage data used for generating the assignment rule), i.e., operated or activated with less than a predetermined minimum probability. Only those control elements remain in the menu level that lead to motor vehicle functions or are assigned to motor vehicle functions that are activated or operated in the current additional driving situation according to the minimum probability. This results in the advantage that the user is only shown those control elements that they are likely to operate in the current driving situation.

One embodiment provides that each deleted control element is arranged in a predetermined alternate menu level. In the event that the user wishes to operate one of the deleted control elements, they can switch to the replacement menu level and find the control element deleted from the original menu level there. This results in the advantage that the full operating range of the operating device is retained.

One embodiment provides that the assignment rule comprises a decision rule which specifies a predetermined switching grid for the respective menu level regarding the possible number of control elements. In the menu level, not every control element is therefore simply retained or deleted independently of the other control elements. Rather, the number of remaining control elements must meet a predetermined condition specified by the decision rule. This results in the switching grid. For example, it can be provided that one of the following constellations must always be available in the menu level: eight or six or three control elements. Switching therefore only occurs if the assignment rule for a driving situation recognizes that there are a number of control elements that correspond to the switching grid. This means that as many control elements are deleted in each case that the adapted menu level corresponds to the switching grid again. In particular, the switching grid provides that at least two control elements are always deleted or added again. This has the advantage that the menu level can only be changed if there is a correspondingly large change in the observation data. This prevents "flickering", i.e., a single control element from being displayed and deleted within one minute, for example. The menu level is only adapted when the observation data reveal such a large change in the driving situation that, for example, at least two control elements have to be deleted or added again.

One embodiment provides that, in the event that only a single control element would remain in a menu level (according to the user data used for generating the assignment rule), instead of displaying this remaining control element, the motor vehicle function, which can be activated by the control element, is activated directly. Therefore, instead of displaying a menu level with only one control element, the complete menu level is hidden. This has the advantage that, in the event that only a single control element in the current additional driving situation is selected by the user in a menu level with a predetermined minimum probability, this leads directly to the automatic activation of the user interface for the motor vehicle function or to the activation of the motor vehicle function itself (e.g. switching on the radio). The user is therefore spared the need to operate the individual control element.

One embodiment provides that, when adapting the state of the operating device to the additional driving situation, a sorting is specified by the assignment rule for at least one list of function parameters. In other words, the sorting sequence in the list is adapted depending on the additional driving situation, whereby the sorting sequence is specified by the assignment rule. The advantage of this is that the most probable function parameters or the most probable values for a function parameter can be displayed to a user in the list at the top, right at the beginning.

For example, one embodiment provides that at least one list displays telephone numbers and/or navigation destinations and/or radio stations as function parameters. Such lists can be extensive, so time is saved when selecting a function parameter by sparing the user from having to scroll through the list. The most probable values for the function parameters (e.g., the most likely names or radio stations) can be displayed at the beginning of the list.

One embodiment provides that the observation data describe at least one of the following characteristics of a driving situation: a time of day of a trip and/or a day of the week of the trip and/or a weather situation and/or temperature during the trip and/or a region through which the trip passes and/or a destination of the trip predetermined in a navigation system and/or estimated by a destination estimate. Depending on the concrete value of the respective characteristic, this results in a driving situation. The various characteristics have proven to be particularly significant for predicting user behavior, so that they can be used to reliably provide an operating device adapted to the expected user behavior for the driving situation or to the expected selection of vehicle functions and/or function parameters.

The invention also comprises the operating device itself. The operating device is intended for a motor vehicle and has a processor device which is equipped or adapted to carry out an embodiment of the invention-related method. For this purpose, the processor device can comprise at least one microcontroller and/or at least one microprocessor. The processor device can have a program code adapted to execute the embodiment of the method when executed by the processor device. The program code can be stored in a data memory of the processor device. The operating device may, for example, be embodied as an infotainment system (information entertainment system) for a motor vehicle.

The invention also comprises a motor vehicle with an embodiment of the invention-related operating device. The invention-related motor vehicle is preferably designed as a motor vehicle, in particular as a passenger car or truck.

The invention also comprises combinations of the features of the embodiments described.

BRIEF DESCRIPTION OF THE DRAWINGS

The following describes examples of the invention's embodiment. Here.

DETAILED DESCRIPTION

Figure 1:
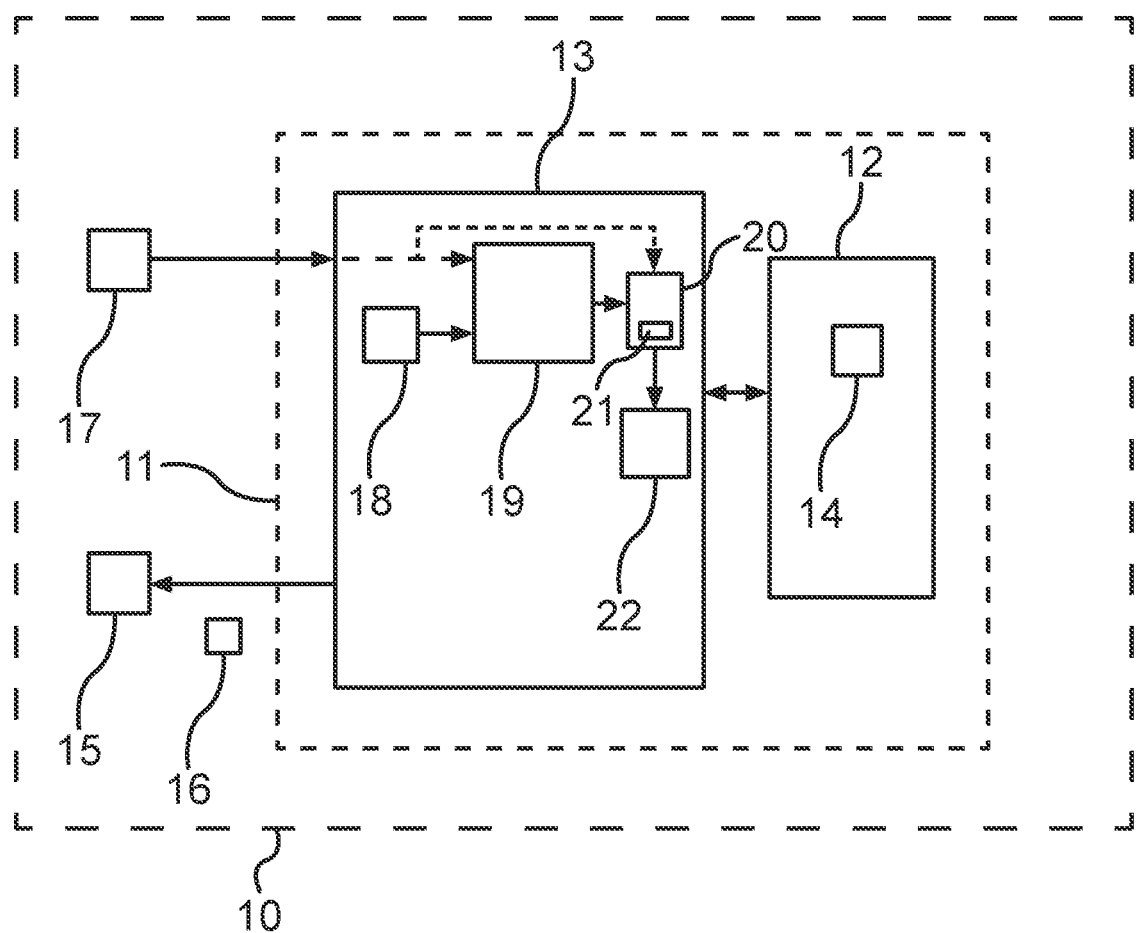
FIG. 1 shows a schematic view of an embodiment of the invention-related motor vehicle.

The examples of embodiment explained below are the preferred embodiments of the invention. In the examples of embodiment, the described components of the embodiment each represent individual features of the invention which must be considered independently of each other and which further develop the invention independently of each other and must thus also be regarded individually or in a combination other than the one shown as part of the invention. In addition, the forms of embodiment described can be supplemented by other features of the invention already described.

In the figures, identical reference numerals denote elements with the same functions.

FIG. 1 shows a motor vehicle 10 which may be a motor vehicle, in particular a passenger car or a truck. The motor vehicle 10 may have a control device 11 which may be designed, for example, as an infotainment system of the motor vehicle 10. A display device 12 and a processor device 13 of the operating device 11 are displayed. The display device 12 can be controlled by the processor device 13. The display device 12 can, for example, be a touch screen. At least one control element 14 can be shown on the display device 12, as it is further explained in connection with FIG. 2.

The operating device 11 can control at least one motor vehicle function 15 of the motor vehicle 10 depending on an operation or actuation of at least one control element 14. Such a motor vehicle function can include, for example, the radio or telephone or media playback in the motor vehicle 10. To control the respective motor vehicle function 15, the operating device 11 can generate the respective control data 16. The operating device 11 can observe or recognize the current driving situation. For this purpose, the operating device 11 can receive observation data 17, which describe, for example, a current temperature and/or a current destination. The observation data 17 can, for example, be generated in the operating device 11 itself (not symbolized in FIG. 1) and/or received from the Internet, for example from a data source (for example an online weather service and/or online traffic service) and/or be generated by at least one sensor device of the motor vehicle 10 and/or describe at least one state of at least one vehicle component. This results in a driving situation depending on the current values described in the observation data 17. Furthermore, usage data 18 can be determined in the operating device 11. The usage data 18 describe which motor vehicle function 15 is currently activated, i.e., has been selected by a user and activated by means of a control element 14. In addition or alternatively, the usage data 18 can indicate which function parameter has been set by a user in the respective at least one motor vehicle function 15, for example by means of a control element 14.

The operating device 11 can be used to predict which settings relating to vehicle functions 15 to be activated and/or function parameters to be adjusted a user will select in a respective additional driving situation. For this purpose, an assignment rule 20 is generated by means of the observation data 17 and the usage data 18 of at least one driving situation by means of a method of machine learning 19. For example, the assignment rule 20 may comprise a trained neural network. In addition, a decision rule 21 can, for example, be provided downstream of the neural network. By means of the assignment rule 20, a configuration data record 22, for example, which determines which control element 15 is to be offered to the user, can then be generated as a function of further observation data 17 which describe an additional driving situation for which the usage data 18 is not yet available, because the user will select this displayed control element 14 with a predetermined minimum probability which can be determined by the assignment rule.

Figure 2:
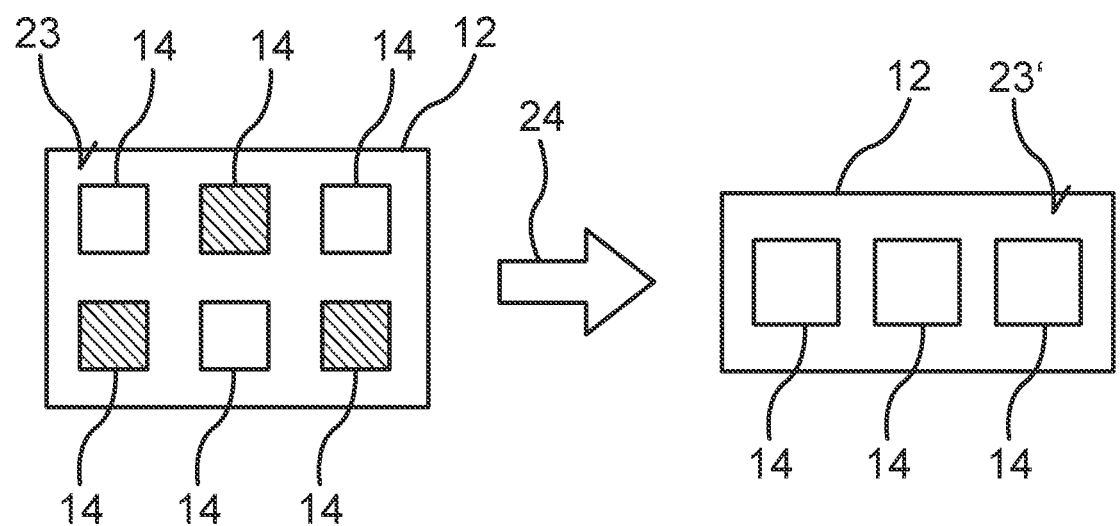
FIG. 2 shows a sketch illustrating a menu level of a menu structure of the operating device of FIG. 1.

FIG. 2 illustrates this using the example of a menu level 23 of a menu structure, in which six control elements 14 are shown in the example of FIG. 2 with the unadapted operating device 11, i.e., according to a factory setting. The control elements 14 can be implemented as icons or buttons or graphic symbols, for example. Depending on the observation data 17, the assignment rule 20 can specify that three of the control elements (crosshatched in FIG. 2) are deleted by an adaptation 24 because the respective motor vehicle function assigned to these control elements is operated with less than a predetermined minimum probability in the current driving situation as described by the current observation data 17. The adapted menu level 23 therefore only contains those control elements 14 which are operated or selected with a predetermined minimum probability in the current driving situation. This provides more space on the display device 12 for the remaining control elements. In comparison to the unadapted state, the control elements can therefore also be displayed in larger form. This makes it easier for a user to hit or touch the remaining control elements 14 with a finger, for example.

Thus, based on the fact that a person usually makes subconscious decisions according to a certain scheme, the user interface, which is displayed on the display device 12, is dynamically adapted to these conditions. For this purpose, a user/behavior analysis is performed in real time using artificial neural networks. For example, multi-layer perceptrons may be provided. A user behavior pattern can be recognized on the basis of their usage data and the additionally recorded observation data. The regularities or correlations or conditions discovered in this way can be used for the adaptation of the user interface and optionally determine the degree of adaptation by means of a decision rule 21 by only carrying out an adaptation 24 in a predetermined connection grid. A separate artificial neural network may be provided for each user interface which can be displayed on the display device 12 by means of the operating device 11. This means that the procedure of machine learning 19 can also distinguish between the individual, intended user interfaces by switching between a respective artificial neural network. Various observation data 17, such as sensor data, are included in the individual networks in order to implement pattern recognition. Examples of such observational data include, inter alia, information on the day, time, motion and/or geo-position of the motor vehicle.

This results in an individual optimization of the user interface according to user behavior, including various observation data using a procedure of machine learning 19.

The operating device 11 can therefore be personalized automatically and individually, which in turn can lead to an increase in operating speed, for example. As long searching through a control structure no longer forces a user to be careless in road traffic, this is also less tiring.

The observation data from the motor vehicle and the usage data can be provided to the processor device 13 in which these data (observation data 17, usage data 18) can be used in such a way by means of the procedure of machine learning 19, for example by an artificial neural network for training. Depending on the application, the neural networks can be adapted to achieve the best possible results.

FIG. 2 illustrates how the number of control elements 14 to be displayed can be reduced by the adaptation 24 of an operating level, for example a main menu. However, before each adaptation 24 is made, a user is preferably informed of the forthcoming adaptation 24 and the user is offered the option to decide or select whether to reject the adaptation 24. If the adaptation 24 is rejected, the operating level remains unchanged. This results in the advantage that, from the user's point of view, a control element 14 cannot simply disappear and they therefore have to search for it with even more effort.

The illustrated adaptation 24 can also be used for a submenu (for operating a radio and/or media playback).

Possible applications include adapting a main menu to reduce an initial or factory-provided unadapted display of N control elements (N, for example, eight). This can be implemented after a predetermined minimum useful service life if it is ensured that sufficient usage data 18 and observation data 17 have been collected. As a result, for example, a reduction to fewer than the N control elements can be achieved, for example to three control elements, as shown in FIG. 2. The less used control elements can be moved to a spare operating level.

Further possible applications are as follows: Telephone numbers and/or navigation destinations and/or radio stations can be sorted according to day and/or time. A motor vehicle setting, such as seat heating on/off, can be provided depending on the weather conditions and/or interior temperature. A radio station can be set according to day of the week and/or time of day.

Overall, the examples show how the invention can dynamically adapt a user interface to a driver's habits.

The invention claimed is:

1. A method for adapting an operating device in a motor vehicle, comprising:
providing the motor vehicle with the operating device, the operating device configured to control at least one function of the motor vehicle and to display a number of control elements for activating the at least one motor vehicle function;
collecting observation data which describes a current driving situation of the motor vehicle;
collecting usage data which describes a status of one or more vehicle functions and/or a present setting of one or more vehicle functions;
generating an assignment rule via machine learning, the assignment rule configured to derive a driving situation from the observation data in order to establish which usage data is appropriate for the driving situation;
adapting the operating device according to the assignment rule; and
setting of at least one function parameter of the at least one function of the motor vehicle according to the assignment rule,
wherein, in an adapted state, the number of control elements displayed by the operating device is less than a predetermined quantity of control elements displayed in an un-adapted state,
wherein, the at least one function parameter is set differently from a predetermined standard setting,
wherein, during adapting of the operating device, at least one control element having a probability of use less than a predetermined threshold is removed from a primary operating level of an interface of the operating device,
wherein the assignment rule comprises a decision rule which describes a minimum number of control elements which must be changed simultaneously before the operating device can be adapted, and
wherein the minimum number of control elements which must be changed simultaneously is at least two control elements.

2. The method of claim 1, wherein each control element removed from the primary operating level is arranged in a secondary operating level.

3. The method of claim 2, wherein, if only a single control element would remain in the primary operating level, the single control element is activated directly and the secondary operating level is displayed on the operating device.

4. The method of claim 2, wherein the assignment rule further comprises a sorting rule for sorting at least one list of function parameters.

5. The method of claim 2, wherein the observation data comprises at least one of: a current time of day, a current day of the week, a current weather situation, a current temperature, a route planned in a navigation system, a region through which the planned route passes, a destination of the planned route, and an estimated destination.

6. The method of claim 1, wherein, if only a single control element would remain in the primary operating level, the single control element is activated directly and a secondary operating level is displayed on the operating device.

7. The method of claim 6, wherein the assignment rule further comprises a sorting rule for sorting at least one list of function parameters.

8. The method of claim 6, wherein the observation data comprises at least one of: a current time of day, a current day of the week, a current weather situation, a current temperature, a route planned in a navigation system, a region through which the planned route passes, a destination of the planned route, and an estimated destination.

9. The method of claim 1, wherein the assignment rule further comprises a sorting rule for sorting at least one list of function parameters.

10. The method of claim 9, wherein the at least one list of function parameters comprises at least one of: telephone numbers, navigation destinations, and radio stations.

11. The method of claim 9, wherein the observation data comprises at least one of: a current time of day, a current day of the week, a current weather situation, a current temperature, a route planned in a navigation system, a region through which the planned route passes, a destination of the planned route, and an estimated destination.

12. The method of claim 1, wherein the observation data comprises at least one of: a current time of day, a current day of the week, a current weather situation, a current temperature, a route planned in a navigation system, a region through which the planned route passes, a destination of the planned route, and an estimated destination.

13. The method of claim 1, wherein a user authorization is required before the operating device is adapted and/or the at least one function parameter is set.

14. The method of claim 1, wherein the observation data is collected from at least one sensor of the motor vehicle.

15. The method of claim 1, wherein the observation data is retrieved via the internet.

* * * * *